J. Haines,
Culinary Ladle,
Nº 19,419. Patented Feb. 23, 1858.
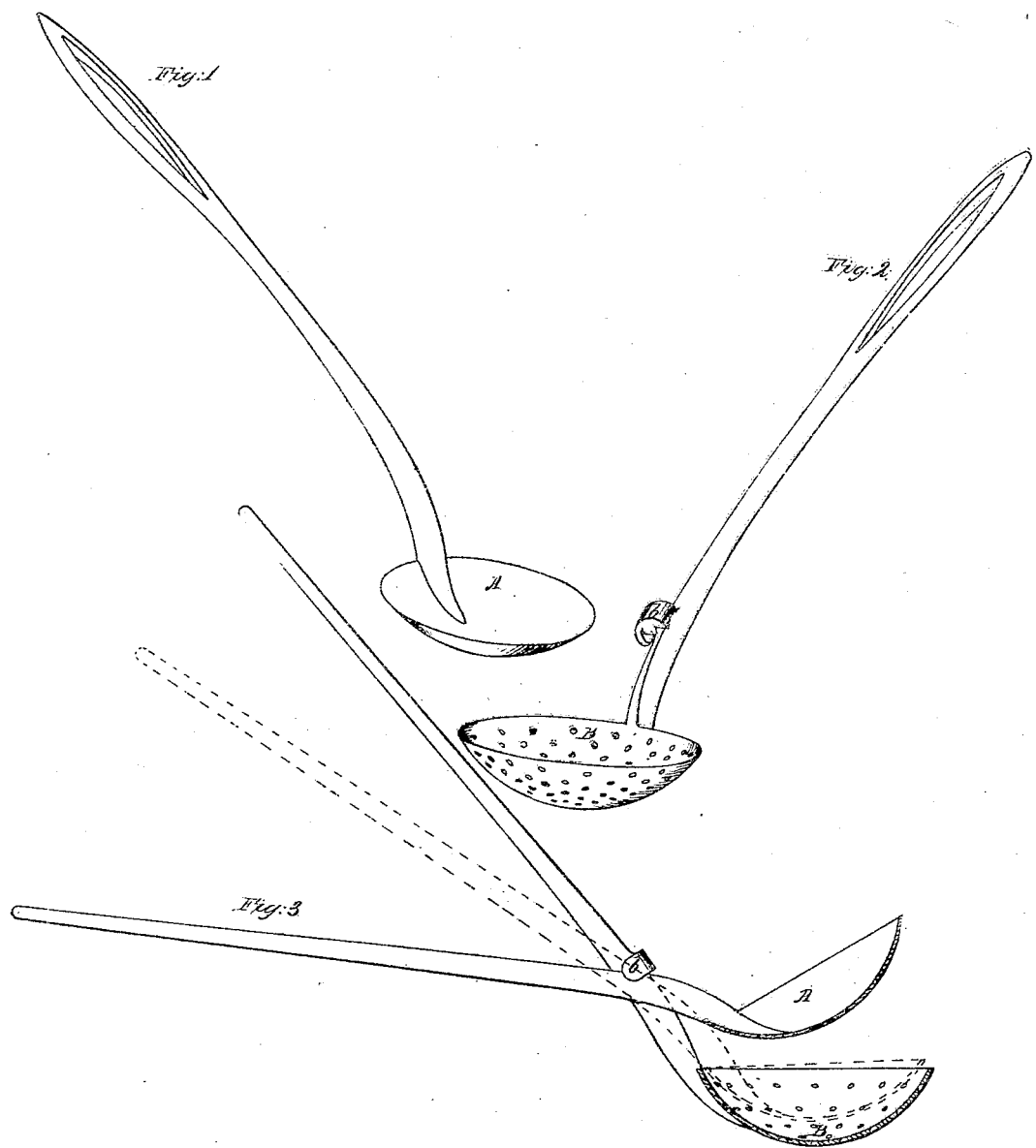

UNITED STATES PATENT OFFICE.

JOSEPH C. HAINES, OF DUBLIN, INDIANA.

CULINARY LADLE.

Specification of Letters Patent No. 19,419, dated February 23, 1858.

*To all whom it may concern:*

Be it known that I, JOSEPH C. HAINES, of Dublin, Wayne county, Indiana, have invented a new and useful Improvement in Culinary Ladles; and I hereby declare the following to be a full and exact description of the same, reference being had to the accompanying drawings, making part of this specification.

The complete and efficient means employed in lard factories to express the fatty matters from animal tissues are not adapted for use on a small scale and for this reason the appliances in domestic use for this purpose continue to be of the most primitive and inefficient description. The cracklings are usually taken up piecemeal from the kettle into a strainer and the fat partially expressed by the application of a bowl of a ladle or spoon which in the hands of female operators, is at once a very laborious and imperfect process.

My improvement consists in so constructing these utensils that after serving in their separate capacities as ladle and strainer they can be employed in conjunction, easily and effectually to express the lard from the cracklings.

In the accompanying drawings Figure 1 represents the ladle and Fig. 2 the strainer. Fig. 3 shows the ladle and strainer as coupled for the purpose of expressing lard.

Projecting from the handle of the strainer B, a short distance from the bowl is a hook $b$, adapted to receive the handle of the ladle A, as represented. When the ladle and strainer are thus coupled, the hook $b$, serves both to steady the bowls and to afford a fulcrum by means of which the operator can easily apply the requisite force. At each fresh charge of crackling the ladle A, is placed in an elevated and rather backward position as shown by strong lines in Fig. 3, and is then gradually pushed forward on the fulcrum $b$, and at the same time closed down so as to approach the position represented by dotted lines. The upper edge of the ladle handle should be formed to facilitate its adjustment.

It is obvious that various modifications may be made of this device. Thus the fulcrum may be attached to the handle of the ladle A, its point in this case being directed upward, and in either case it may be made adjustable in a slot, and furnished with a tightening screw. Or instead of the hook an adjustable shackle on one handle may fall into a rack on the other. The bowl of the ladle may be corrugated underneath to increase its retentive power but practical tests induce a preference for the forms here shown.

I claim as new and of my invention herein:—

The ladle A, and strainer B $b$, adapted to operate in conjunction, substantially in the manner set forth.

In testimony of which invention I hereunto set my hand.

JOSEPH C. HAINES.

Attest:
GEO. H. KNIGHT,
OLIVER C. GREEN.